US012613318B2

(12) United States Patent (10) Patent No.: US 12,613,318 B2
Chen et al. (45) Date of Patent: Apr. 28, 2026

(54) LASER EMITTING UNIT FOR LIDAR AND LIDAR

(71) Applicant: Hesai Technology Co., Ltd., Shanghai (CN)

(72) Inventors: Jie Chen, Shanghai (CN); Shaoqing Xiang, Shanghai (CN)

(73) Assignee: Hesai Technology Co, Ltd., Shanghai (CN)

( * ) Notice: Subject to any disclaimer, the term of this patent is extended or adjusted under 35 U.S.C. 154(b) by 735 days.

(21) Appl. No.: 18/081,002

(22) Filed: Dec. 14, 2022

(65) Prior Publication Data

US 2023/0184901 A1      Jun. 15, 2023

Related U.S. Application Data

(63) Continuation of application No. PCT/CN2021/109211, filed on Jul. 29, 2021.

(30) Foreign Application Priority Data

Aug. 25, 2020    (CN) .......................... 202010865171.6

(51) Int. Cl.
   *G01S 7/481*          (2006.01)
   *G01S 17/08*          (2006.01)
(52) U.S. Cl.
   CPC .......... *G01S 7/4814* (2013.01); *G01S 7/4816* (2013.01); *G01S 17/08* (2013.01)
(58) Field of Classification Search
   CPC ................................. G01S 7/4814; G01S 7/08
   See application file for complete search history.

(56) References Cited

U.S. PATENT DOCUMENTS

| | | | |
|---|---|---|---|
| 2002/0171608 A1 | 11/2002 | Kanai et al. | |
| 2014/0217901 A1* | 8/2014 | Logiudice | H05B 45/12 315/297 |
| 2020/0249318 A1* | 8/2020 | Henderson | G01S 7/4814 |

FOREIGN PATENT DOCUMENTS

| | | | | | |
|---|---|---|---|---|---|
| CN | 102360151 A | * | 2/2012 | ............. | H04N 23/74 |
| CN | 102455513 A | | 5/2012 | | |
| CN | 104932321 A | | 9/2015 | | |
| CN | 110260823 A | | 9/2019 | | |
| CN | 210109317 U | | 2/2020 | | |

(Continued)

*Primary Examiner* — Isam A Alsomiri

(74) *Attorney, Agent, or Firm* — Wilson Sonsini Goodrich & Rosati

(57) ABSTRACT

A laser emitting unit for a lidar includes a light emitting surface and provides an emission light directed to a target object. The emission light forms an echo light by a target object, and is received by a light receiving apparatus. The light emitting surface includes: a first end arranged close to the light receiving apparatus and a second end arranged away from the light receiving apparatus, a direction from the first end to the second end representing a first direction, and a direction vertical to the first direction representing a second direction. The light emitting surface includes: an effective light emitting region in which light emitting sources are arranged and an ineffective light emitting region in which no light emitting source is arranged, the effective light emitting region including, along the first direction, a plurality of light emitting sub-regions, respectively config-ured to detect target objects at different distances.

15 Claims, 9 Drawing Sheets

(56)  References Cited

FOREIGN PATENT DOCUMENTS

| CN | 111246073 | A | 6/2020 | | |
| CN | 114185054 | A | 3/2022 | | |
| EP | 3537180 | A1 * | 9/2019 | ............ | G01S 17/88 |
| KR | 101683771 | B1 | 12/2016 | | |
| WO | WO-2022042196 | A1 | 3/2022 | | |

* cited by examiner

20

20

405

LASER EMITTING UNIT FOR LIDAR AND LIDAR

CROSS-REFERENCE

This application is a continuation of International Patent Application PCT/CN2021/109211, filed on Jul. 29, 2021, which claims the benefit of Chinese Application No. CN202010865171.6, filed on Aug. 25, 2020, each of which is entirely incorporated herein by reference.

TECHNICAL FIELD

The present invention relates to the field of lidars, and in particular, to a laser emitting unit for a lidar and a lidar.

BACKGROUND

A lidar undertakes important tasks such as roadside detection, obstacle recognition, and simultaneous localization and mapping (SLAM) in automatic driving.

Specifically, a lidar system includes a laser emitting system and a light receiving system. The laser emitting system includes a laser emitting unit which generates an emission light pulse. The emission light pulse is incident on a target object, and then is reflected to generate an echo light. Finally, the echo light is received by the light receiving system. The lidar accurately measures transmission duration between emission and reflection of an incident light pulse. Since the light pulse is propagated at the speed of light, and the speed of light is known, the transmission duration can be converted into a measured distance.

The lidar can precisely measure a target position (a distance and an angle), a motion state (a speed, vibration, and a posture) and a shape, to detect, identify, distinguish and track a target. Due to a fast measurement speed, high precision and a capability of long-distance ranging, the lidar is widely used in unmanned vehicles.

However, in disclosed technologies, the laser emitting unit of the lidar has the problem of relatively high emission power.

SUMMARY

The present invention solves the problem of providing a laser emitting unit for a lidar and a lidar, to reduce emission power.

The technical solutions of the present invention provide a laser emitting unit for a lidar, where the laser emitting unit includes a light emitting surface and is configured to provide an emission light directed to a target object, the emission light forms an echo light by the target object and is received by a light receiving apparatus, the light emitting surface includes a first end arranged close to the light receiving apparatus and a second end arranged away from the light receiving apparatus, a direction from the first end to the second end represents a first direction, and a direction vertical to the first direction represents a second direction, where the light emitting surface of the laser emitting unit includes an effective light emitting region in which light emitting sources are arranged and an ineffective light emitting region in which no light emitting source is arranged, and the effective light emitting region includes, along the first direction, a plurality of light emitting sub-regions, respectively configured to detect target objects at different distances.

Optionally, along the first direction, an arrangement density of the light emitting sources of the plurality of light emitting sub-regions gradually decreases.

Optionally, along the first direction, sizes of the plurality of light emitting sub-regions in the second direction gradually decrease.

Optionally, all light emitting sources in the effective light emitting region emit light simultaneously, and/or selected light emitting sub-regions corresponding to different distances of the target objects emit light.

Optionally, ranging distances corresponding each light emitting sub-region for detecting the target object along the first direction gradually decrease.

Optionally, the light emitting sub-region close to the first end is a first light emitting sub-region, configured to detect target objects located further than a first distance, and the light emitting sub-region close to the second end is a second light emitting sub-region, configured to detect target objects located closer than a second distance, and the second distance is less than the first distance.

Optionally, a plurality of third light emitting sub-regions are located between the first light emitting sub-region and the second light emitting sub-region, and the third light emitting sub-region is configured to detect target objects located between the second distance and the first distance.

Optionally, the first light emitting sub-region and the second light emitting sub-region are rectangular, and the third light emitting sub-region is trapezoidal or rectangular.

Optionally, a part of the plurality of third light emitting sub-regions adjacent to the first end is a base part, and a spacing between the base parts of the adjacent third light emitting sub-regions gradually increases along the first direction.

Optionally, a size of the effective light emitting region in the first direction is greater than a size of the effective light emitting region in the second direction. Optionally, the light emitting sources are in a staggered arrangement along the first direction and/or the second direction in the light emitting sub-region; or the light emitting sources are in a matrix arrangement in the light emitting sub-region.

Optionally, the light emitting source is a vertical-cavity surface-emitting laser.

Accordingly, an embodiment of the present invention further provides a lidar, including: the laser emitting unit provided in the embodiment of the present invention, configured to provide an emission light directed to a target object, the emission light forming an echo light by the target object; and a light receiving apparatus, arranged close to a first end of the laser emitting unit and configured to detect the echo light.

Optionally, the lidar further includes: a control unit, configured to control all light emitting sources of an effective light emitting region to emit light, and control the light receiving apparatus to receive a detection signal.

Optionally, the control unit obtains distance information of the target object based on the detection signal, and controls the light emitting sources in the light emitting sub-region corresponding to the distance information to emit light.

Compared with the conventional technologies, the technical solutions of the present invention have the following advantages. The light emitting surface of the laser emitting unit of the present invention includes: an effective light emitting region in which light emitting sources are arranged and an ineffective light emitting region in which no light emitting source is arranged, the effective light emitting region including, along the first direction, a plurality of light emitting sub-regions, respectively configured to detect target objects at different distances. Relative to the whole light emitting surface of the laser emitting unit is arranged with the light emitting sources, the effective light emitting region arranged with the light emitting sources is a part of the whole light emitting surface, so as to reduce an area arranged by the light emitting sources on the whole light emitting surface. The laser emitting unit in the embodiment of the present invention arranges the light emitting sources on the local light emitting surface, and the plurality of light emitting sub-regions can respectively detect the target objects at different distances. In this way, on the basis of guaranteeing the ranging performance of the lidar for the target objects at different distances, an arrangement of the light emitting sources is optimized, and a quantity of the light emitting sources on the light emitting surface is reduced, thereby reducing emission power of the laser emitting unit and heat generated by the laser emitting unit.

In an optional solution, along the first direction, sizes of the plurality of light emitting sub-regions gradually decrease, that is, an area of the light emitting sub-region arranged with the light emitting sources gradually decreases, so as to further reduce the emission power of the laser emitting unit and the heat generated by the laser emitting unit.

In an optional solution, along the first direction, an arrangement density of the light emitting sources in the plurality of light emitting sub-regions gradually decreases, and the decrease in the density of the light emitting sources can further reduce the quantity of the light emitting sources, so as to further reduce the emission power of the laser emitting unit and the heat generated by the laser emitting unit.

DETAILED DESCRIPTION

In combination with FIG. 1 which is a schematic diagram of a light path of a lidar and FIG. 2 which is a schematic diagram of echo signal strengths changing with distances, the reasons for relatively high emission power of the lidar are analyzed below.

A laser emitting unit 1 includes a light emitting surface having a plurality of light emitting sources, and is configured to provide an emission light directed to a target object S1 (or S2). The emission light reaches the target object S1 (or S2) through a first set of optical lens 3, and forms an echo light by the target object S1 (or S2). The echo light forms a light spot T1 (or T2) on a detection surface of a light receiving apparatus 2 through a second set of optical lens 4, and is detected by the light receiving apparatus 2, so as to implement detection of the target object S1 (or S2).

In the lidar, the light emitting surface of the laser emitting unit 1 and the detection surface of the light receiving apparatus 2 are arranged in the same direction, and an emitting end and a receiving end each has a set of optical lens, which can make light emission and light reception isolated from each other without interference. However, a non-coaxial light path has a near-far effect, that is, when the distance of the target object changes, the light spot of the echo light on the detection surface moves.

Figure 1:
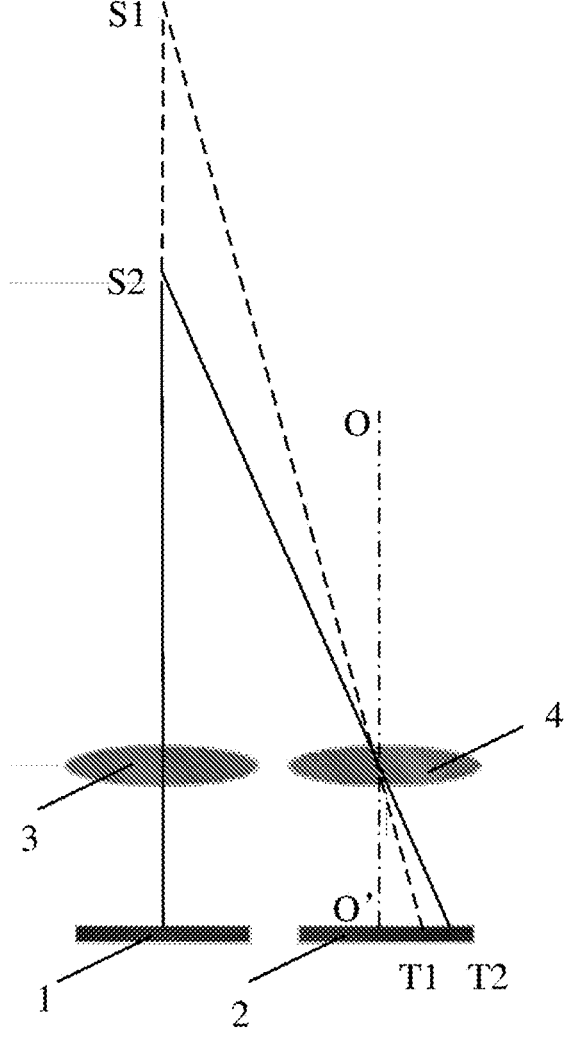
FIG. 1 is a schematic diagram of a light path of a lidar.

Specifically, as shown in FIG. 1, a light spot formed by the long-range target object S1 on the light receiving apparatus 2 is T1, and a light spot formed by the short-range target object S2 on the light receiving apparatus 2 is T2. That is, with the increase of the distance of the target object, the light spot moves towards a direction close to the laser emitting unit 1. The light receiving apparatus 2 is placed on a focal plane of the second set of optical lens 4, so after a light spot of the echo reflected by the target object is focused through the second set of optical lens 4, a size of the light spot D' formed on the light receiving apparatus 2 meets the following formula 1.

$$D' = D * \frac{f}{d} \qquad \text{Formula 1}$$

Where D is a size of the light spot incident on the second set of optical lens 4, f is a focal length of the set of optical lens, and d is a distance between the target object and the second set of optical lens 4. Since the light spot incident on the second set of optical lens 4 (the light spot of the echo reflected by the target object) usually covers the whole second set of optical lens 4, the size of the light spot D incident on the second set of optical lens 4 is usually the same.

According to the above formula 1, the size of the light spot D' formed on the light receiving apparatus 2 is inversely proportional to the distance d between the target object and the second set of optical lens 4. Specifically, the further the distance of the target object (that is, the greater d is), the smaller the size of the light spot formed by the target object on the light receiving apparatus 2; and the closer the target object (that is, the smaller d is), the greater the size of the light spot formed by the target object on the light receiving apparatus 2.

Figure 2:
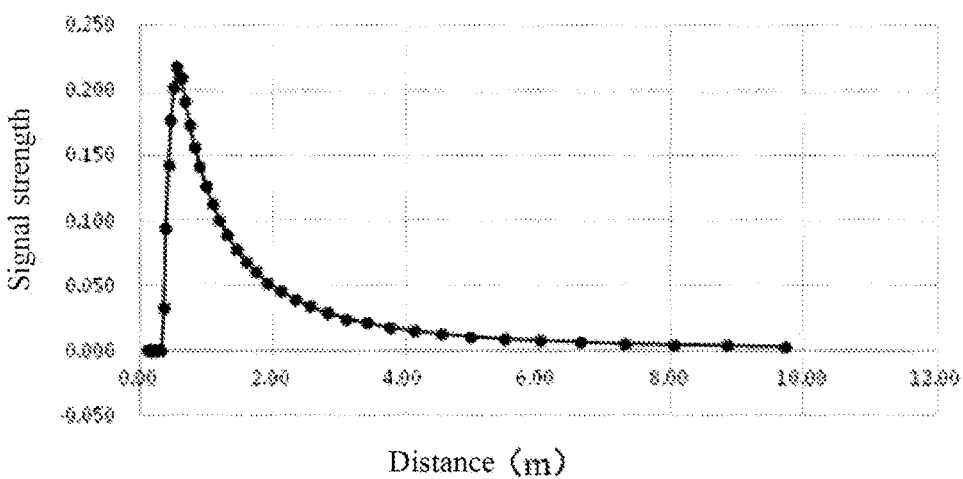
FIG. 2 is a schematic diagram of echo signal strengths detected by the lidar shown in FIG. 1 changing with distances.

FIG. 2 is a schematic diagram of echo signal strengths of a laser emitting unit changing with distances. When the distance is relatively great (more than 10 m), the light spot of the echo is relatively small, and there is energy loss in a light transmission process due to a relatively long light transmission path, so the signal strength of the echo detected accordingly is relatively small. As the distance gradually decreases (between 1 m and 10 m), the light energy loss decreases, and the light spot slowly grows and adjacent light spots overlap each other, so the signal strength of the echo begins to increase. When the distance of the target object is less than 1 m, the light spot grows rapidly and adjacent light spots overlap each other, so as to generate a relatively great signal strength. When the distance is less than 0.6 m, since the light spot gradually moves out of a detectable range of the light receiving apparatus 2, the signal strength of the echo gradually decreases. When the distance is reduced to within 0.3 m, the light spot moves out of the detection surface of the light receiving apparatus 2.

For lidar ranging, that the light receiving apparatus 2 can detect a light signal means that distance measurement can be implemented. For an object in a short range, the echo signal is relatively strong. However, the light emitting sources arranged in the same way as those for detecting long-range objects are used for light emission, which actually causes a waste of light emission power, and there is a problem of relatively high emission power.

In order to solve the problem of relatively high emission power of the laser emitting unit in the lidar, the present invention provides a laser emitting unit for a lidar, the laser emitting unit including a light emitting surface and configured to provide an emission light directed to a target object, the emission light forming an echo light by the target object and being received by a light receiving apparatus, the light emitting surface including a first end arranged close to the light receiving apparatus and a second end arranged away from the light receiving apparatus, a direction from the first end to the second end representing a first direction, and a direction vertical to the first direction representing a second direction, the light emitting surface of the laser emitting unit including an effective light emitting region in which light emitting sources are arranged and an ineffective light emitting region in which no light emitting source is arranged, and the effective light emitting region including, along the first direction, a plurality of light emitting sub-regions, respectively configured to detect target objects at different distances.

The light emitting surface of the laser emitting unit in the present invention includes: an effective light emitting region in which light emitting sources are arranged and an ineffective light emitting region in which no light emitting source is arranged, the effective light emitting region including, along the first direction, a plurality of light emitting sub-regions, respectively configured to detect target objects at different distances. Relative to the laser emitting unit in which the whole light emitting surface is arranged with the light emitting sources, the effective light emitting region arranged with the light emitting sources occupies a part of the whole light emitting surface, so as to reduce an area occupied by the light emitting sources on the whole light emitting surface. The laser emitting unit in the embodiment of the present invention may arrange the light emitting sources on the local light emitting surface, and the plurality of light emitting sub-regions can respectively detect the target objects at different distances. In this way, on the basis of guaranteeing the ranging performance of the lidar for the target objects at different distances, an arrangement manner of the light emitting sources is optimized, and a quantity of the light emitting sources on the light emitting surface is reduced, thereby reducing the emission power of the laser emitting unit and the heat generated by the laser emitting unit.

Figure 3:
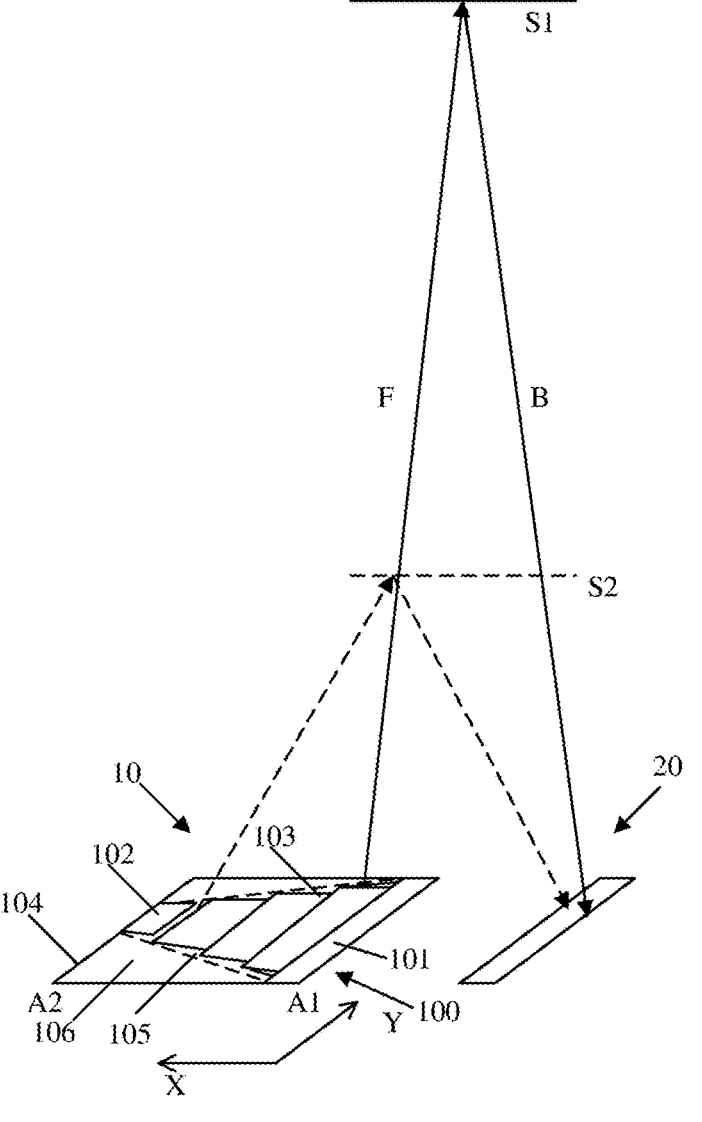
FIG. 3 is a schematic diagram of a light path of a first embodiment of a laser emitting unit according to the present invention.

Referring to FIG. 3, FIG. 3 is a schematic diagram of a light path of an embodiment of a laser emitting unit according to the present invention.

In this embodiment, a laser emitting unit 10 is applied to the lidar to generate an emission light for detecting the distance of the target object. Specifically, the laser emitting unit 10 includes a light emitting surface 104 having a plurality of light emitting sources, and is configured to provide an emission light F directed to the target object 51. The emission light F reaches the target object 51 through a first set of optical lens (not shown in the figure), and forms an echo light B by the target object 51. The echo light B passes by a second set of optical lens (not shown in the figure), and then is received by a light receiving apparatus 20, so as to implement detection of the target object.

In this embodiment, the laser emitting unit 10 is a planar array of laser emitting sources, and the light emitting source on the light emitting surface 104 is a vertical-cavity surface-emitting laser (VCSEL). Specifically, the VCSEL includes: a substrate, and a resonant cavity located on the substrate. The resonant cavity includes a bottom Bragg reflector, an active region and a top Bragg reflector successively located on the substrate, and a light outlet window is arranged above the resonant cavity. The VCSEL emits a laser vertical to the substrate from the light outlet window.

Specifically, the active region may be a quantum well. The quantum well can generate photons when a voltage is loaded. The photons oscillate in the resonant cavity to form a laser. The laser is emitted through the light outlet window to form a light emitting source.

In order to solve the problem of relatively high emission power of the laser emitting unit, the laser emitting unit in this embodiment improves the arrangement of the light emitting sources. Specifically, according to the above principle, when the distance of the target object changes, the light spot of the echo light on the detection surface moves and the size of the light spot changes. According to the above formula 1 and parameters of the lens, it is known that the size of the light spot of the echo is greater than a size of the detection surface (as shown in FIG. 5 to FIG. 8). Therefore, in a practical application, a position of the detection surface remains unchanged. Based on the characteristic of the light spot of the echo moving towards a direction far from the laser emitting unit and a feature of the light spot of the echo that the size gradually grows with the distance of the target object decreasing, according to the principle of light path reversibility, the light emitting sources corresponding to the light spot of the echo not detected by the detection surface are omitted, so as to improve the arrangement of the light emitting sources.

Figure 4:
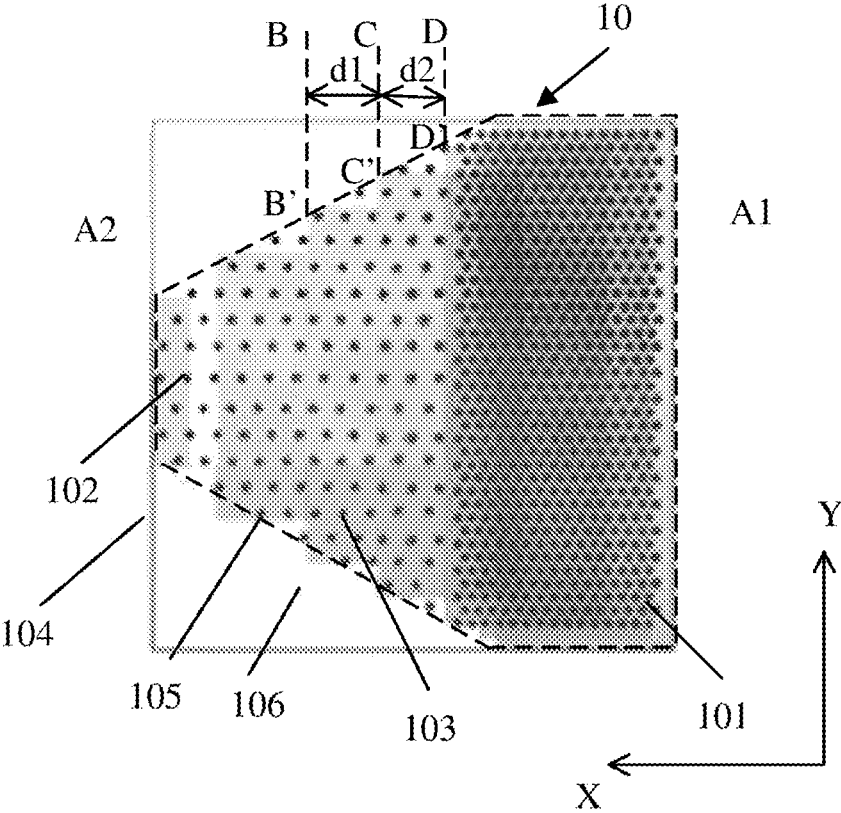
FIG. 4 is a partial enlarged view of the laser emitting unit in FIG. 3.

FIG. 4 is an enlarged view of the laser emitting unit in FIG. 3. With reference to FIG. 4, the light emitting surface 104 includes: a first end A1 arranged close to the light receiving apparatus 20 and a second end A2 arranged away from the light receiving apparatus 20. A direction from the first end A1 to the second end A2 represents a first direction X, and a direction vertical to the first direction X represents a second direction Y.

In this embodiment, the light emitting surface 104 is rectangular, an end close to the light receiving apparatus 20 is the first end A1, and an end away from the light receiving apparatus is the second end A2.

Specifically, the light emitting surface 104 includes: a region in which the light emitting sources are arranged (such as a region shown by a dotted line box in FIG. 3 and FIG. 4, that is, an effective light emitting region 105) and a region in which no light emitting source is arranged (such as a blank region in FIG. 3 and FIG. 4, that is, an ineffective light emitting region 106). In the region in which the light emitting sources are arranged, the laser is emitted, so this region is defined as the effective light emitting region 105, and the region in which no light emitting source is arranged is the ineffective light emitting region 106.

The light emitting surface 104 in this embodiment includes a hexagonal effective light emitting region 105. A longer first side of the hexagon is close to the first end A1, and a second side opposite to the first side in the first direction X is close to the second end A2.

It is to be noted that the effective light emitting region 105 being hexagonal means that the outline of the region in which the light emitting sources are arranged on the light emitting surface 104 roughly forms a hexagon. In other embodiments, the effective light emitting region 105 may also be other shapes, as long as the size in the second direction Y gradually decreases along the first direction X, and an area of the region in which the light emitting sources are arranged tends to decrease along the first direction X.

As shown in FIG. 4, the effective light emitting region 105 includes, in the first direction X, a plurality of light emitting sub-regions, respectively configured to detect target objects at different distances. The light emitting sub-region close to the first end A1 is a first light emitting sub-region 101, configured to detect target objects located further than a first distance; and the light emitting sub-region close to the second end A2 is a second light emitting sub-region 102, configured to detect target objects located closer than a second distance, and the second distance is less than the first distance.

A plurality of third light emitting sub-regions 103 are located between the first light emitting sub-region 101 and the second light emitting sub-region 102, and the third light emitting sub-region 103 is configured to detect target objects located between the second distance and the first distance, that is, configured to detect target objects in a middle distance range.

For example, the first light emitting sub-region 101 is configured to detect the target objects located further than the first distance (for example, within a range of 15 m to 25 m); and the second light emitting sub-region 102 is configured to detect the target objects located closer than the second distance (for example, within a range of 0.3 m to 0.6 m); and the plurality of third light emitting sub-regions 103 located between the first light emitting sub-region 101 and the second light emitting sub-region 102 respectively detect target objects within ranges of 10 m to 20 m, 5 m to 10 m, 2.5 m to 5 m, 1.25 m to 2.5 m, and 0.6 m to 1.25 m correspondingly.

Figure 5:
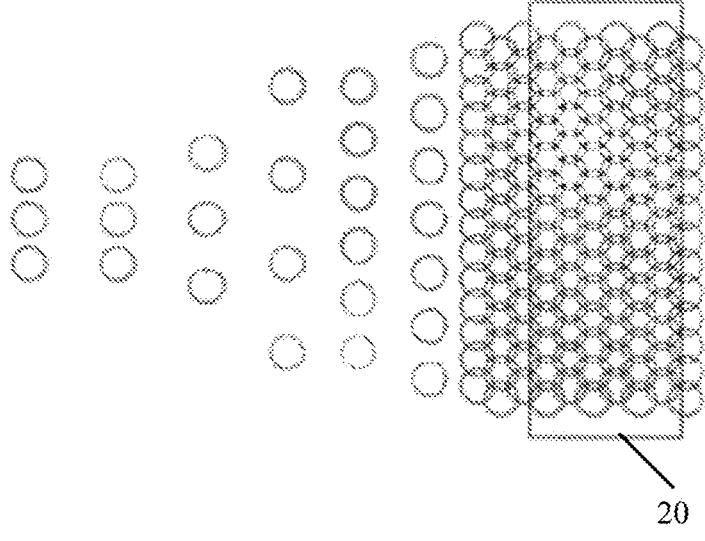
FIG. 5 to FIG. 8 respectively show light spots of the echo generated through detection of target objects at different distances by the laser emitting unit shown in FIG. 4.
Figure 6:
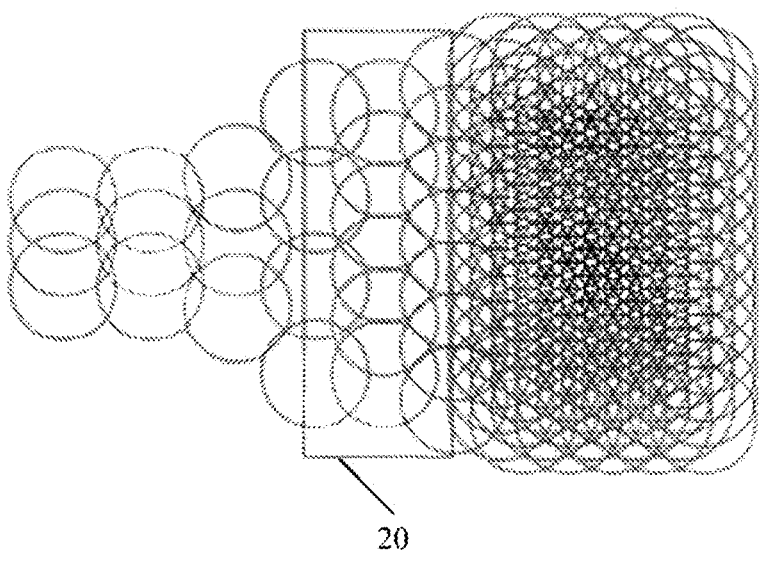
Figure 7:
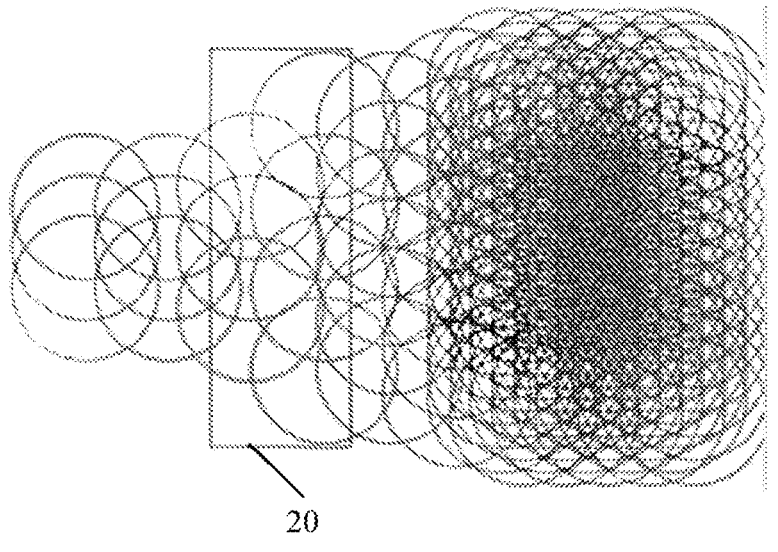
Figure 8:
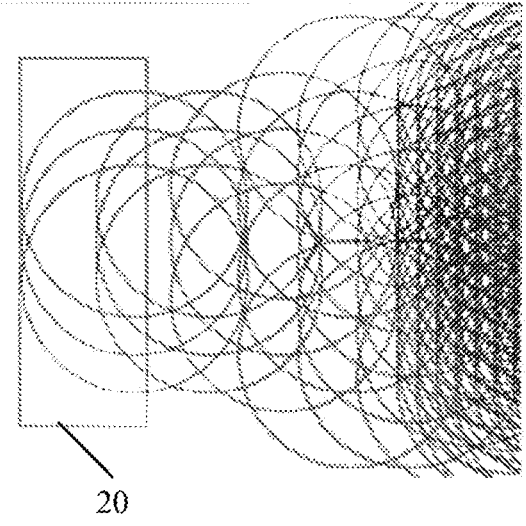

Specifically, according to the above principle, when the distance of the target object changes, the light spot of the echo light on the detection surface moves and the size of the light spot changes. According to the above formula 1 and the parameters of the lens, it can be known that the size of the light spot of the echo is greater than the size of the detection surface (as shown in FIG. 5 to FIG. 8). Therefore, in the practical application, the position of the detection surface remains unchanged. For the long-range target object (that is, the target object located further than the first distance), the light spot of the echo corresponding to the first light emitting sub-region 101 may be set to aim at the detection surface (as shown in FIG. 5). As the distance of the target object (the target object located between the second distance and the first distance) decreases, the light spot of the echo moves towards the direction away from the laser emitting unit, and the size of the light spot of the echo gradually increases. Based on this characteristic, the light spots of the echo corresponding to the plurality of third light emitting sub-regions 103 are detected by the detection surface (as shown in FIG. 6 and FIG. 7). For the short-range target object, the light spot of the echo corresponding to the second light emitting sub-region 102 is detected by the detection surface (as shown in FIG. 8).

Specifically, the effective light emitting region 105 is hexagonal, including a rectangular first light emitting sub-region 101 located at the first end A1, a rectangular second light emitting sub-region 102 located at the second end A2, and a plurality of third light emitting sub-regions 103. A light emitting region formed by the plurality of third light emitting sub-regions 103 is an isosceles trapezoid, the lower bottom of the isosceles trapezoid is close to the first end A1, and the upper bottom is close to the second end A2.

The first light emitting sub-region 101 is arranged close to the light receiving apparatus 20 in the lidar. Accordingly, the second light emitting sub-region 102 is arranged away from the light receiving apparatus 20 in the lidar. A central axis of the isosceles trapezoid is arranged in a plane where an optical axis of the first set of optical lens and an optical axis of the second set of optical lens are located, so that the light spot formed by the light emitting sources on the light receiving apparatus 20 moves along a direction of the central axis.

The effective light emitting region 105 includes, along the first direction X, a plurality of light emitting sub-regions. Each light emitting sub-region is respectively configured to detect target objects at different distances. Specifically, the light emitted by the light emitting source of the light emitting sub-region can be detected by the light receiving apparatus 20 after being reflected by the target object at a corresponding distance, so as to implement detection at a corresponding distance.

Specifically, the first light emitting sub-region 101 close to the first end A1 is configured to detect the long-range target object S1, the second light emitting sub-region 102 close to the second end A2 is configured to detect the short-range target object S2, and one or more third light emitting sub-regions 103 located between the first light emitting sub-region 101 and the second light emitting sub-region 102 are configured to detect the target object in the middle distance range. Accordingly, for the plurality of light emitting sub-regions arranged along the first direction X, an arrangement density of the light emitting sources gradually decreases.

As shown in FIG. 3 and FIG. 4, for each light emitting sub-region of the effective light emitting region 105 in the first direction X, the arrangement density of the light emitting sources gradually decreases. Specifically, the light emitting sources of the first light emitting sub-region 101 close to the first end A1 is the densest, and the arrangement density is the largest; the light emitting sources of the second light emitting sub-region 102 close to the second end A2 is the sparsest, and the arrangement density is the smallest; and the arrangement density of the light emitting sources of the third light emitting sub-region 103 located between the first light emitting sub-region 101 and the second light emitting sub-region 102 is in the middle.

It is to be noted that if a quantity of the third light emitting sub-regions 103 is multiple, accordingly, for the plurality of third light emitting sub-regions 103 along the first direction X, the arrangement density of the light emitting sources gradually decreases. Relative to the laser emitting unit in which the whole light emitting surface is arranged with the light emitting sources, the effective light emitting region 105 arranged with the light emitting sources in the present invention is a part of the whole light emitting surface, so as to reduce an area arranged by the light emitting sources on the whole light emitting surface 104. In addition, along the first direction, the arrangement density of the light emitting sources of the plurality of light emitting sub-regions gradually decreases, so the laser emitting unit of the present invention can arrange a small quantity of light emitting sources on the local light emitting surface. In addition, the plurality of light emitting sub-regions can respectively detect the target objects at different distances. In this way, on the basis of guaranteeing the ranging performance of the lidar for the target objects at different distances, an arrangement of the light emitting sources is optimized, and the emission power of the laser emitting unit is reduced, and the laser emitting unit with reduced light emitting sources can be driven with less voltage, so as to reduce the heat generated by the laser emitting unit.

FIG. 5, FIG. 6, FIG. 7 and FIG. 8 respectively show a diagram of a position relationship between the light spot of the echo generated by the target object at a distance of 20 m, 1 m, 0.7 m and 0.4 m and the light receiving apparatus 20. The principle of solving technical problems in the technical solution of this embodiment is explained in combination with FIG. 3 to FIG. 8.

It is to be noted that description is made herein by using an example in which the light receiving apparatus 20 is a detector. Specifically, the light receiving apparatus 20 can convert a light signal into an electrical signal, for example, the detector is an array of an avalanche photo diode (APD), or a silicon photo multiplier (SiPM), or a single photon avalanche diode (SPAD).

As shown in FIG. 5, when the distance of the target object is 20 m, the size of the light spot of the echo is relatively small, and the light spot of the echo generated by the light emitting source of the first light emitting sub-region close to the first end A1 is detected by the detector.

As shown in FIG. 6, as the distance of the target object decreases, when the distance of the target object is 1 m, the position of the light spot of the echo moves, and the light spot of the echo generated by the light emitting source of the third light emitting sub-region 103 close to the first light emitting sub-region 101 is detected by the detector. The arrangement density of the light emitting sources of the third light emitting sub-region 103 is slightly smaller, but the size of the light spot increases as the distance of the target object decreases. After the light spot grows, the light spots of the adjacent echoes overlap each other to cover the detection surface of the detector.

As shown in FIG. 7, as the distance of the target object further decreases, when the distance of the target object is 0.7 m, the position of the light spot of the echo moves rapidly, and the light spot of the echo generated by the light emitting source of the third light emitting sub-region 103 close to the second light emitting sub-region 102 is detected by the detector. Relative to the embodiment shown in FIG. 6, the arrangement density of the light emitting sources of the third light emitting sub-region 103 further decreases, but the size of the light spot increases rapidly as the distance of the target object decreases, and the light spots of the adjacent echoes overlap each other and cover the detection surface of the detector.

As shown in FIG. 8, as the distance of the target object further decreases again, when the distance of the target object is 0.4 m, the position of the light spot of the echo moves rapidly, and the light spot of the echo generated by the light emitting source of the second light emitting sub-region 102 is detected by the detector. The arrangement density of the light emitting sources of the second light emitting sub-region 102 is the smallest, with only a few dispersed light emitting sources. However, when the target object is relatively close, because the size of the light spot formed by the echo light is very large, the light spots of the adjacent echoes have a relatively large overlapping region and cover the detection surface of the detector.

In combination with the comprehensive analysis of FIG. 5 to FIG. 8, this embodiment optimizes and designs the arrangement of the light emitting sources on the light emitting surface of the laser emitting unit by using the principle that the light spot of the echo formed by the target objects at different distances moves in a plane where the detector is located, and the closer the target object, correspondingly the larger the size of the light spot of the echo.

Specifically, based on the feature of the light spot of the echo moving, on the premise that an area of the detector and a relative position of the laser emitting unit remain unchanged, this embodiment arranges the plurality of light emitting sub-regions in the first direction X of the laser emitting unit, and the light emitted by the light emitting source of each light emitting sub-region is reflected by the target object at a corresponding distance and then is detected by the detector. Through arranging the light emitting sources to extend along the first direction X, the problem that the light spot of the echo moves along the first direction on the detector is solved, so that the function of correspondingly detecting the distances of different target objects through each light emitting sub-region is realized.

In an optional solution, a size of the effective light emitting region 105 in the first direction X may be greater than a size in the second direction Y. That is, through making the effective light emitting region of the laser emitting unit in this embodiment extend along the first direction X, the effective light emitting region becomes a long light source. In this way, in addition to compensating the moving of the light spot, a horizontal divergence angle of the laser emitting unit can also be increased, so as to reduce a blind region.

Based on the feature of the light spot of the echo that the size gradually increases as the distance of the target object decreases, on the one hand, this embodiment gradually reduces the size of the light emitting sub-region (the size along the second direction Y) along the first direction X, so that the size of the light spot in the second direction Y of each light emitting sub-region can cover the detector after increasing, so as not to affect a ranging function of the lidar. On the other hand, the density of the light emitting sources of each light emitting sub-region in the first direction X gradually decreases, which is based on the feature that the size of the light spot of the echo increases. Although the arrangement density of the light emitting sources decreases when detecting close target objects, the light spots of the adjacent light emitting sources grow to overlap each other, so that the detector is still covered, so as to realize the ranging function of the lidar. The laser emitting unit of the embodiment of the present invention optimizes the arrangement of the light emitting sources, and realizes the function of detecting target objects at different distances through fewer light emitting sources, so as to reduce the emission power of the laser emitting unit.

It is to be noted that in this embodiment, the first light emitting sub-region 101 and the second light emitting sub-region 102 are rectangular, and the third light emitting sub-region 103 located between the first light emitting sub-region and the second emitting sub-region is trapezoidal. This is because the first light emitting sub-region 101 is configured to detect the long-range target object that has just entered the detectable range of the detector, and the size of the light spot basically does not change. Therefore, the first light emitting sub-region 101 is densely arranged with the light emitting sources, so that the shape of the light spot arrangement region is the same as that of the detector. However, the plurality of third light emitting sub-regions 103 are located in the region where the size of the light spot gradually increases. In combination with this feature, the shape of the third light emitting sub-region 103 is set as a trapezoid. The light spot formed by the light emitting source at the upper bottom of the trapezoid is larger than that at the lower bottom, so that the detector can still be covered. The first light emitting sub-region 101 is configured to detect close target objects close to the blind region. The light spots formed on the detector are very large, which can overlap each other and completely cover the detector. Therefore, the first light emitting sub-region 101 is set to have the same shape as the detector, and it is sufficient to sporadically arrange a few light emitting sources.

In a process of detecting the target object from far to near, because the size of the light spot in the first direction X also gradually increases, and a coverage area of the light spot on the detector along the first direction X also increases, spacings of the plurality of third light emitting sub-regions along the first direction X can gradually increase. Specifically, a side of the third light emitting sub-region 103 close to the first end A1 is a basis side. The plurality of third light emitting sub-regions 103 include basis sides BB', CC' and DD'. A spacing between the basis sides BB' and CC' of the adjacent third light emitting sub-regions 103 close to the second end A2 is d1, and a spacing between the basis sides CC' and DD' of the adjacent third light emitting sub-regions 103 close to the first end A1 is d2. The distance increases gradually along the first direction X, that is, d1 is greater than d2.

It is to be noted that for the laser emitting unit of the embodiment of the present invention, the spacings of the plurality of third light emitting sub-regions along the first direction may also have a plurality of ways, such as: a spacing between base parts of the adjacent third light emitting sub-regions remains unchanged (that is, the plurality of third light emitting sub-regions are evenly divided); or the spacing between the base parts of the adjacent third light emitting sub-regions gradually decreases along the first direction.

It is to be noted that in the practical application, in combination with the detectable range of the detector, the areas of the detection surface and the light emitting surface, and the parameters (such as a focal length) of the second set of optical lens, the arrangement of the light emitting sources is simulated, different light emitting sub-regions are divided, and the arrangement of the light emitting sources of the different light emitting sub-regions is arranged, so as to determine whether the light spot formed by the light emitting sources in each light emitting sub-region can cover the detector. Then, based on the specification requirements of the lidar, shapes, distances, first sizes, second sizes of different light emitting sub-regions and an arrangement density value of the light emitting sources in each light emitting sub-region can be further adjusted slightly to obtain the optimal arrangement of the light emitting sources on the final light emitting surface.

It should be further noted that, it is sufficient to meet the requirement that the density of the light emitting sources in each light emitting sub-region tends to decrease along the first direction. The arrangement density value of the light emitting sources inside a single light emitting sub-region may be a spacing range, that is, the light emitting sources in a light emitting sub-region are arranged in a non-uniform manner, or the density of the light emitting sources in each local region inside a light emitting sub-region may be different.

In addition, the VCSEL emits light through loading voltage to electrodes at the bottom and top of the resonant cavity. The laser emitting unit of this embodiment may be the plurality of light emitting sources that are optimally arranged on a whole substrate. Through simultaneously loading voltage to the electrode corresponding to each light emitting source, all light emitting sources can emit light simultaneously. Since the quantity of light emitting sources in this embodiment decreases, a total parallel resistance increases, thereby reducing the power of the laser emitting unit.

In other embodiments, the laser emitting unit may further be that the light emitting sources of each light emitting sub-region are integrated together on different substrates. For this embodiment, the laser emitting unit can control the light emitting sources of each light emitting sub-region simultaneously to emit light simultaneously, or control the light emitting sources of each light emitting sub-region separately, so that selected light emitting sub-regions corresponding to different distances of the target object emit light.

It is to be noted that in the embodiments shown in FIG. 3 and FIG. 4, the light emitting region formed by the plurality of third light emitting sub-regions 103 in the effective light emitting region 105 is an isosceles trapezoid, and a size of a side of the first light emitting sub-region 101 is the same as that of an upper bottom of the isosceles trapezoid, a size of a side of the second light emitting sub-region 102 is the same as that of a lower bottom of the isosceles trapezoid, and the plurality of third light emitting sub-regions 103 gradually decrease along a waist of the isosceles trapezoid in the second direction Y.

In the foregoing embodiment, the third light emitting sub-region is further included between the first light emitting sub-region and the second light emitting sub-region. Referring to a second embodiment of the laser emitting unit shown in FIG. 9, an effective light emitting surface of a laser emitting unit 30 may further only include: a first light emitting sub-region 201 located at the first end, and a second light emitting sub-region 202 located at the second end, respectively configured to detect a long-range target object and a close target object. That is, in the second embodiment, the effective light emitting surface does not include the third light emitting sub-region.

Figure 9:
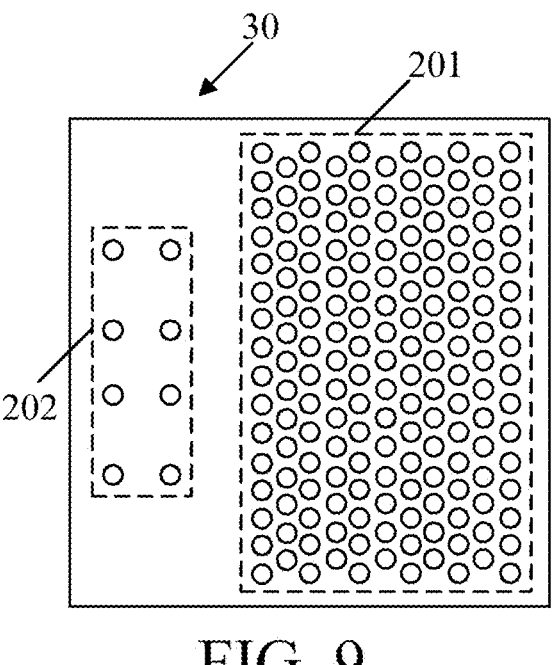
FIG. 9 is a schematic diagram of a second embodiment of a laser emitting unit according to the present invention.

In the embodiment shown in FIG. 9, the density of the light emitting sources of the second light emitting sub-region 202 is less than that of the light emitting sources of the first light emitting sub-region 201, so that the quantity of the light emitting sources can be reduced, so as to further reduce the light emission power.

It should be further noted that, in the embodiment shown in FIG. 9, the light emitting sources of the first light emitting sub-region 201 are in a staggered arrangement, while the light emitting sources of the second light emitting sub-region 202 are arranged in a matrix manner. In other embodiments, the first light emitting sub-region may also be in a matrix arrangement while the second light emitting sub-region is in the staggered arrangement, that is, different light emitting sub-regions can be arranged in different ways on the same effective light emitting surface. In other embodiments, each light emitting sub-region may also be arranged in the same way (for example, each light emitting sub-region is arranged alternately or in array).

Figure 10:
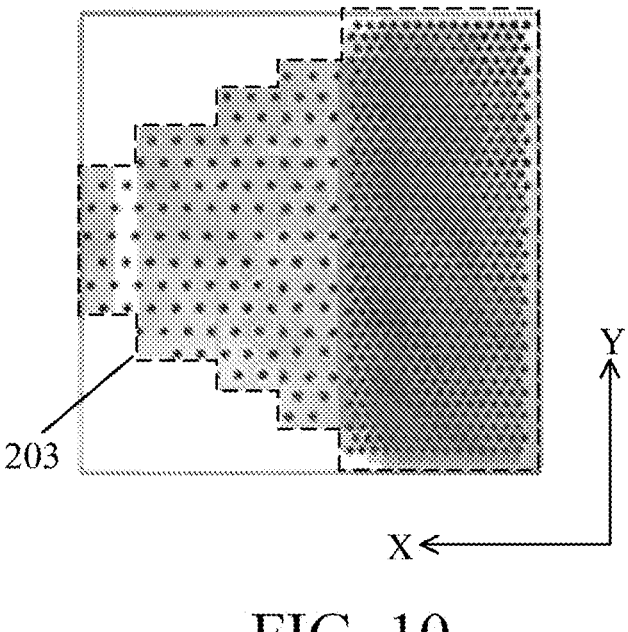
FIG. 10 is a schematic diagram of a third embodiment of a laser emitting unit according to the present invention.

In a third embodiment of the laser emitting unit shown in FIG. 10, a boundary of the effective light emitting region

203 has a serrated boundary, and the first sizes of the plurality of light emitting sub-regions decrease in a mutation manner along the first direction X, that is, the first sizes of the adjacent light emitting sub-regions have a relatively large difference.

Specifically, in this embodiment, the shape of each light emitting sub-region is a rectangle, a long side of the rectangle is along the direction Y, and a short side is along the direction X. The sizes of the long sides of the adjacent rectangular light emitting sub-regions are greatly different, so it is a change of mutation mode.

Figure 11:
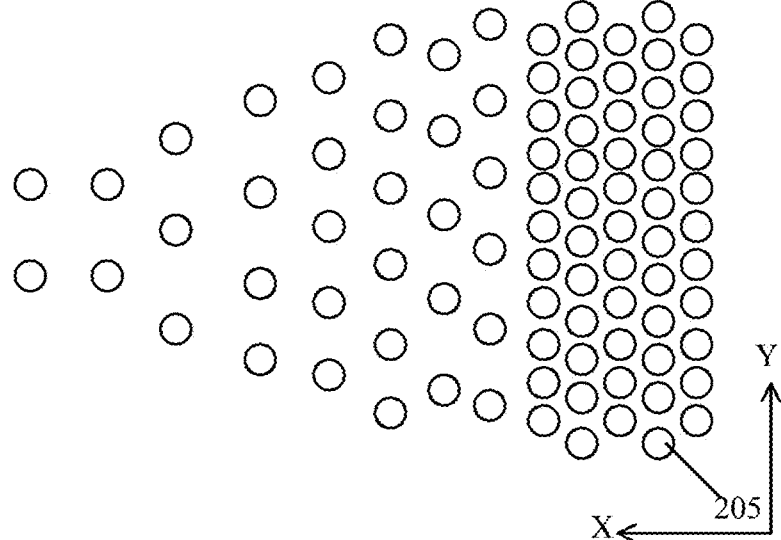
FIG. 11 is a schematic diagram of a fourth embodiment of a laser emitting unit according to the present invention.

Referring to FIG. 11, FIG. 11 is a schematic diagram of a fourth embodiment of a laser emitting unit according to the present invention. In this embodiment, light emitting sources 205 are in the staggered arrangement along the first direction X and the second direction Y in the light emitting sub-region. When the alternate arrangement is adopted, the light spots formed by the light emitted from the adjacent light emitting sources are easy to overlap, so as to cover the detection surface of the light receiving apparatus.

In other embodiments, the light emitting sources may further be in the staggered arrangement along one direction of the first direction or the second direction in the light emitting sub-region, and arranged in alignment along the other direction.

Figure 12:
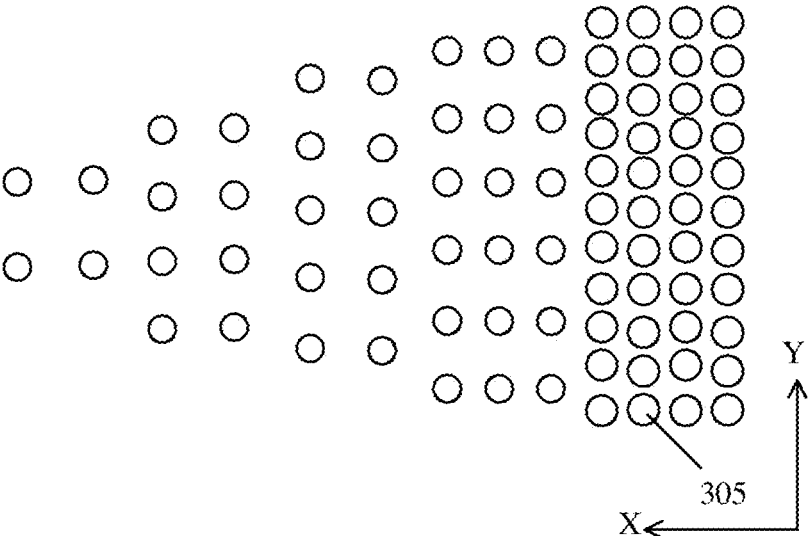
FIG. 12 is a schematic diagram of a fifth embodiment of a laser emitting unit according to the present invention.

Referring to FIG. 12, FIG. 12 is a schematic diagram of a fifth embodiment of a laser emitting unit according to the present invention. In this embodiment, light emitting sources 305 are in the matrix arrangement in the light emitting sub-region, that is, the light emitting sources are arranged in alignment in both the first direction X and the second direction Y.

Figure 13:
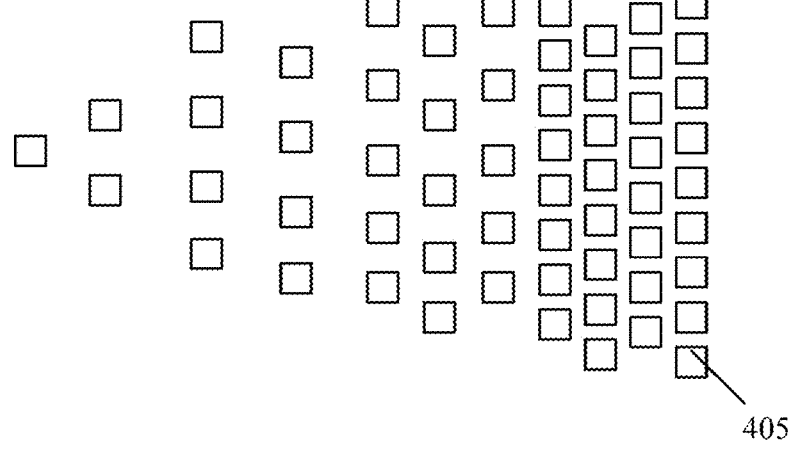
FIG. 13 is a schematic diagram of a sixth embodiment of a laser emitting unit according to the present invention.

It should be noted that, the shape of the light emitting source in the foregoing embodiment is round. Referring to a sixth embodiment of the laser emitting unit shown in FIG. 13, the shape of a light emitting source 405 is rectangular. In order that the light spot can cover the detection surface in the first direction and the second direction, the light emitting sources here are squares.

Figure 14:
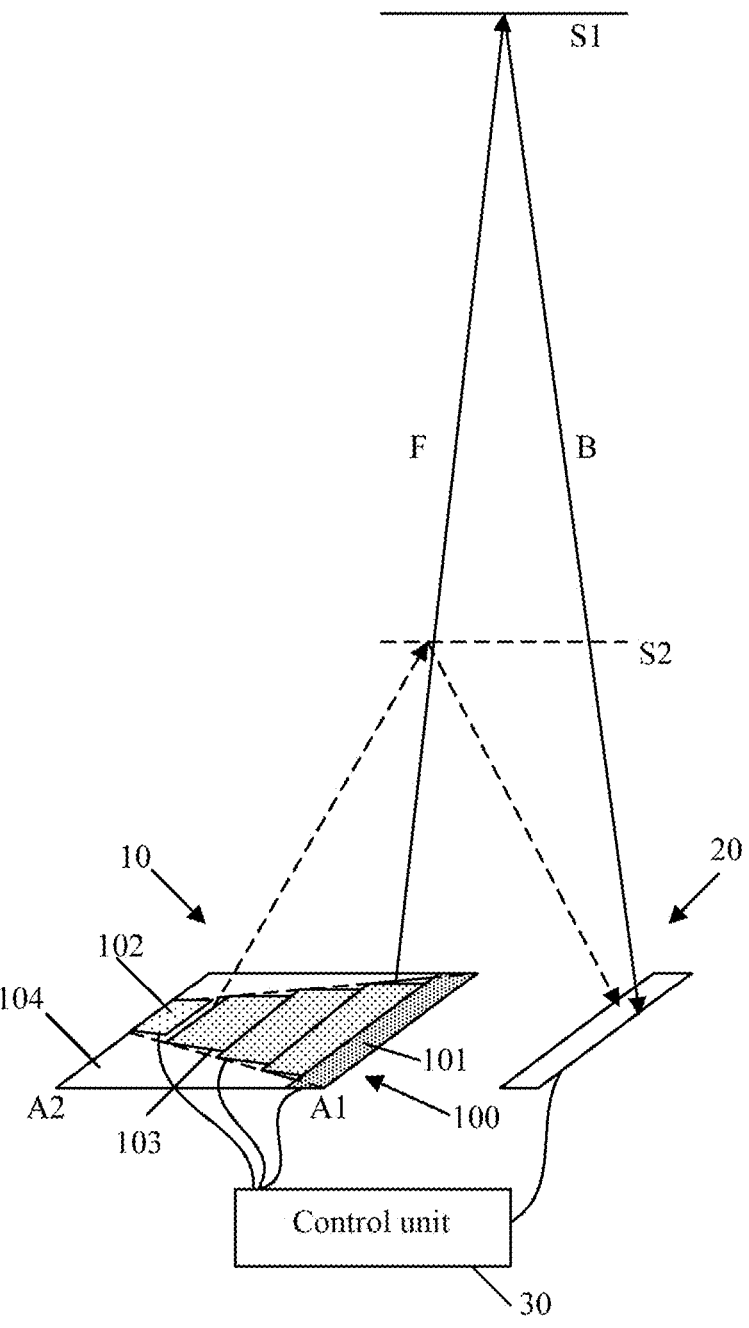
FIG. 14 is a schematic diagram of an embodiment of a lidar according to the present invention.

In order to solve the problem of high emission power of the laser emitting unit, accordingly, the present invention further provides a lidar. Referring to FIG. 14, FIG. 14 is a schematic diagram of an embodiment of a lidar according to the present invention.

The lidar includes: a laser emitting unit 10, configured to provide an emission light directed to a target object, the emission light forming an echo light by the target object. For the related description of the laser emitting unit, reference may be made to the foregoing embodiment, and details are not described again herein.

The lidar further includes a light receiving apparatus 20, arranged close to a first end of the laser emitting unit 10 and configured to detect the echo light. In this embodiment, the light receiving apparatus 20 is a photodetector, which may be an APD or a SiPM, configured to convert a light signal corresponding to the light spot into an electrical signal.

As shown in FIG. 14, the shape of an effective light emitting surface 104 of the laser emitting unit 10 is an isosceles trapezoid, and the light receiving apparatus 20 includes a detection surface, arranged in the same direction with the light emitting surface 104 of the laser emitting unit; and The detection surface is located on a central axis of the isosceles trapezoid, and is arranged to be adjacent to the lower bottom of the isosceles trapezoid.

The lidar further includes: a control unit 30, configured to control all light emitting sources of an effective light emitting region 105 to emit light, and control the light receiving apparatus 20 to detect and receive an echo signal. Because the laser emitting unit of the present invention in which the light emitting sources are arranged in an optimized manner is used, the laser emitting unit only uses a few light emitting sources in a local region, so the emission power of the laser emitting unit in the lidar is relatively small.

Alternatively, the control unit 30 is further configured to, according to distance information in the echo signal obtained by all light emitting sources through emitting light, control the light emitting sources in the light emitting sub-region corresponding to the distance information to emit light, and control the light receiving apparatus 20 to detect.

In this way, the lidar can firstly scan the surrounding objects through all light emitting sources emitting light and obtain the echo signal. Then, based on the echo signal, the distance information is obtained and the lidar controls the activation of the light emitting sub-regions corresponding to the distance information to reduce a quantity of light emission of the light emitting sources, so as to further reduce light emission power.

Although the present invention is disclosed above, the present invention is not limited thereto. Any person skilled in the art can make various changes and modifications without departing from the spirit and the scope of the present invention, and therefore the protection scope of the present invention should be subject to the scope defined by the claims.

What is claimed is:

1. A laser emitting unit for a lidar, wherein the laser emitting unit comprises a light emitting surface and is configured to provide an emission light directed to a target object, the emission light forms an echo light by the target object and is received by a light receiving apparatus, the light emitting surface comprises a first end arranged close to the light receiving apparatus and a second end arranged away from the light receiving apparatus, a direction from the first end to the second end represents a first direction, and a direction vertical to the first direction represents a second direction, wherein the light emitting surface of the laser emitting unit comprises an effective light emitting region in which light emitting sources are arranged and an ineffective light emitting region in which no light emitting source is arranged, the effective light emitting region comprising, along the first direction, a plurality of light emitting sub-regions, respectively configured to detect target objects at different distances.

2. The laser emitting unit according to claim 1, wherein along the first direction, an arrangement density of the light emitting sources of the plurality of light emitting sub-regions gradually decreases.

3. The laser emitting unit according to claim 1, wherein along the first direction, sizes of the plurality of light emitting sub-regions in the second direction gradually decrease.

4. The laser emitting unit according to claim 1, wherein all light emitting sources in the effective light emitting region emit light simultaneously, and/or selected light emitting sub-regions corresponding to different distances of the target objects emit light.

5. The laser emitting unit according to claim 1, wherein ranging distances corresponding to each light emitting sub-region of the plurality of light emitting sub-regions for detecting the target object along the first direction gradually decrease.

6. The laser emitting unit according to claim 1, wherein a light emitting sub-region close to the first end is a first light emitting sub-region, configured to detect target objects located further than a first distance, and a light emitting sub-region close to the second end is a second light emitting sub-region, configured to detect target objects located closer than a second distance, and the second distance is less than the first distance.

7. The laser emitting unit according to claim 6, wherein a plurality of third light emitting sub-regions are located between the first light emitting sub-region and the second light emitting sub-region, and wherein a third light emitting sub-region of the plurality of third light emitting sub-regions is configured to detect target objects located between the second distance and the first distance.

8. The laser emitting unit according to claim 7, wherein the first light emitting sub-region and the second light emitting sub-region are rectangular, and the third light emitting sub-region is trapezoidal or rectangular.

9. The laser emitting unit according to claim 7, wherein a part of the plurality of third light emitting sub-regions adjacent to the first end represents a base part, and a spacing between the base parts of the adjacent plurality of third light emitting sub-regions gradually increases along the first direction.

10. The laser emitting unit according to claim 1, wherein a size of the effective light emitting region in the first direction is greater than a size of the effective light emitting region in the second direction.

11. The laser emitting unit according to claim 1, wherein the light emitting sources are in a staggered arrangement along the first direction and/or the second direction in a light emitting sub-region of the plurality of light emitting sub-regions; or the light emitting sources are in a matrix arrangement in the light emitting sub-region.

12. The laser emitting unit according to claim 11, wherein a light emitting source of the light emitting sources is a vertical-cavity surface-emitting laser.

13. A lidar, comprising:

the laser emitting unit according to claim 12, configured to provide the emission light directed to the target object, the emission light forming the echo light by the target object; and the light receiving apparatus, arranged close to the first end of the laser emitting unit and configured to detect the echo light.

14. The lidar according to claim 13, further comprising: a control unit, configured to control all light emitting sources of an effective light emitting region to emit light, and control the light receiving apparatus to receive a detection signal.

15. The lidar according to claim 14, wherein the control unit obtains distance information of the target object based on the detection signal, and controls the light emitting sources in the light emitting sub-region corresponding to the distance information to emit light.

\* \* \* \* \*